(12) United States Patent
Rajagopalan

(10) Patent No.: US 9,607,524 B2
(45) Date of Patent: Mar. 28, 2017

(54) METHOD AND SYSTEM FOR GENERATING AND EVALUATING ASSESSMENT SHEETS

(71) Applicant: Xerox Corporation, Norwalk, CT (US)

(72) Inventor: Nikesh Anand Rajagopalan, Chennai Tamil Nadu (IN)

(73) Assignee: Xerox Corporation, Norwalk, CT (US)

(*) Notice: Subject to any disclaimer, the term of this patent is extended or adjusted under 35 U.S.C. 154(b) by 521 days.

(21) Appl. No.: 14/016,292

(22) Filed: Sep. 3, 2013

(65) Prior Publication Data
US 2015/0064683 A1  Mar. 5, 2015

(51) Int. Cl.
*G09B 7/00* (2006.01)
*G09B 7/06* (2006.01)
*G09B 7/02* (2006.01)

(52) U.S. Cl.
CPC  *G09B 7/06* (2013.01); *G09B 7/02* (2013.01)

(58) Field of Classification Search
USPC ............... 434/350, 353, 354, 359, 362, 363
See application file for complete search history.

(56) References Cited

U.S. PATENT DOCUMENTS

| | | | |
|---|---|---|---|
| 2005/0255439 A1* | 11/2005 | Cody .................. | G09B 7/06 434/353 |
| 2006/0003306 A1 | 1/2006 | McGinley et al. | |
| 2009/0110270 A1* | 4/2009 | Poor .................. | G09B 7/02 382/165 |
| 2010/0075292 A1 | 3/2010 | DeYoung et al. | |

* cited by examiner

*Primary Examiner* — Kesha Frisby
(74) *Attorney, Agent, or Firm* — Jones Robb PLLC

(57) ABSTRACT

A method, a system, and a computer program product for creating and evaluating assessment sheets are disclosed. The method includes identifying one or more first location identifiers based on one or more markings provided in a scanned master assessment sheet. A machine-readable code (MRC) is generated based on the one or more first location identifiers. The MRC is then split into a plurality of portions and embedded at various locations on a scanned pre-assessment sheet. The scanned pre-assessment sheet with the embedded MRC is then printed to generate the assessment sheets. Thereafter, one or more second location identifiers are identified based on one or more markings provided by evaluatees in each of the assessment sheets provided to them. The one or more second location identifiers are then compared with the one or more first location identifiers. The result of evaluation is provided based on the comparison.

25 Claims, 15 Drawing Sheets

Circle the same letter in each row

| v | p | b | x | v |
| t | d | t | g | h |
| c | m | r | c | d |
| j | j | i | m | p |
| n | t | r | u | n |
| s | x | w | t | s |
| w | w | y | a | z |

Circle the same letter in each row

| v | p | b | x | Ⓥ |
|---|---|---|---|---|
| t | d | Ⓣ | g | h |
| c | m | r | Ⓒ | d |
| j | Ⓙ | i | m | p |
| n | t | r | u | Ⓝ |
| s | x | w | t | Ⓢ |
| w | Ⓦ | y | a | z |

METHOD AND SYSTEM FOR GENERATING AND EVALUATING ASSESSMENT SHEETS

TECHNICAL FIELD

The presently disclosed embodiments are related to an evaluation system. More particularly, the presently disclosed embodiments are related to a technique that facilitates creation and evaluation of the assessment sheets with embedded machine readable codes.

BACKGROUND

Creating and administrating assessments of students' forms/answer/assessment sheets is a major activity in any educational system. Assessments may be descriptive or choice based or a combination of both. In this competitive age, more and more assessments are becoming choice based assessments at all levels of education. Various methods exist to evaluate the assessments and provide the result of the assessments to students. One method of evaluating the assessments is manual evaluation of the assessment by a teacher. However, the manual evaluation of the assessments is very cumbersome, time-consuming and more prone to errors. Another method of evaluating the assessments is automatic evaluation. Various automated systems exist for performing the automatic evaluation of the assessments. In one class of automated systems, the students answer in a separate bubble sheet and the bubble sheet is then fed into the MICR (Magnetic Ink Character Recognition) based systems for evaluation. In another class of automated systems, the answers provided in an assessment sheet are evaluated using imaging techniques. In such systems, correct answers are fed by external systems and information extracted from scanned answer sheets are used to cross verify the correct answers.

SUMMARY

According to embodiments illustrated herein, there is provided a method for creating a plurality of assessment sheets. The method includes identifying one or more first location identifiers of one or more first markings in a scanned master assessment sheet. The one or more first markings are indicative of one or more correct answers of one or more questions. The method further includes generating a machine-readable code based on the one or more first location identifiers. The machine readable code is then split into a plurality of portions. The plurality of portions of the machine readable code is then embedded at a plurality of locations in a scanned pre-assessment sheet. Thereafter, the scanned pre-assessment sheet is printed to create the plurality of assessment sheets.

According to embodiments illustrated herein, there is provided a system for creating a plurality of assessment sheets. The system includes a memory and one or more processors. The memory includes various program instruction modules such as a location identification module, a code generation module, a code splitting module, an embedding module, and a printing module. The location identification module is configured to identify one or more first location identifiers of one or more first markings in a scanned master assessment sheet. The one or more first markings are indicative of one or more correct answers of one or more questions. The code generation module is configured to generate a machine-readable code based on the one or more first location identifiers. The code splitting module is configured to split the machine-readable code into a plurality of portions. The embedding module is configured to embed the plurality of portions of the machine-readable code at a plurality of locations in a scanned pre-assessment sheet. The printing module is configured to print the scanned pre-assessment sheet to create the plurality of assessment sheets.

According to embodiments illustrated herein, there is provided a computer program product for use with a computer. The computer program product comprises a non-transitory computer-usable medium storing a computer-readable program code for creating a plurality of assessment sheets. The computer-readable program code comprises a program instruction means for identifying one or more first location identifiers of one or more first markings in a scanned master assessment sheet. The one or more first markings are indicative of one or more correct answers of one or more questions. The computer-readable program code comprises a program instruction means for generating a machine-readable code for the scanned master assessment sheet based on the one or more first location identifiers. The computer-readable program code comprises a program instruction means for splitting the machine-readable code into a plurality of portions. The computer-readable program code comprises a program instruction means for embedding the plurality of portions of the machine-readable code at a plurality of locations in a scanned pre-assessment sheet. Further, the computer readable medium comprises program instruction means printing the scanned pre-assessment sheet to create the plurality of assessment sheets.

According to embodiments illustrated herein, there is provided a method for evaluating one or more assessments sheets. The method includes combining a plurality of portions of a machine readable code embedded at a plurality of locations in an assessment sheet based on an authentication. Thereafter, the combined MRC is decoded to obtain the one or more first location identifiers. Then, one or more second location identifiers of one or more second markings on each of the plurality of assessment sheets is identified, wherein the one or more second markings are indicative of one or more answers provided by an evaluate. The one or more second location identifiers are then compared with the one or more first location identifiers. Based on the comparison, a result of evaluation is generated.

BRIEF DESCRIPTION OF DRAWINGS

The accompanying drawings illustrate various embodiments of systems, methods, and various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which:

FIG. 4D illustrates a master assessment sheet provided by a user in accordance with at least one embodiment;

FIG. 6C illustrates an example of an assessment sheet with evaluation results.

DETAILED DESCRIPTION

Figure 1:
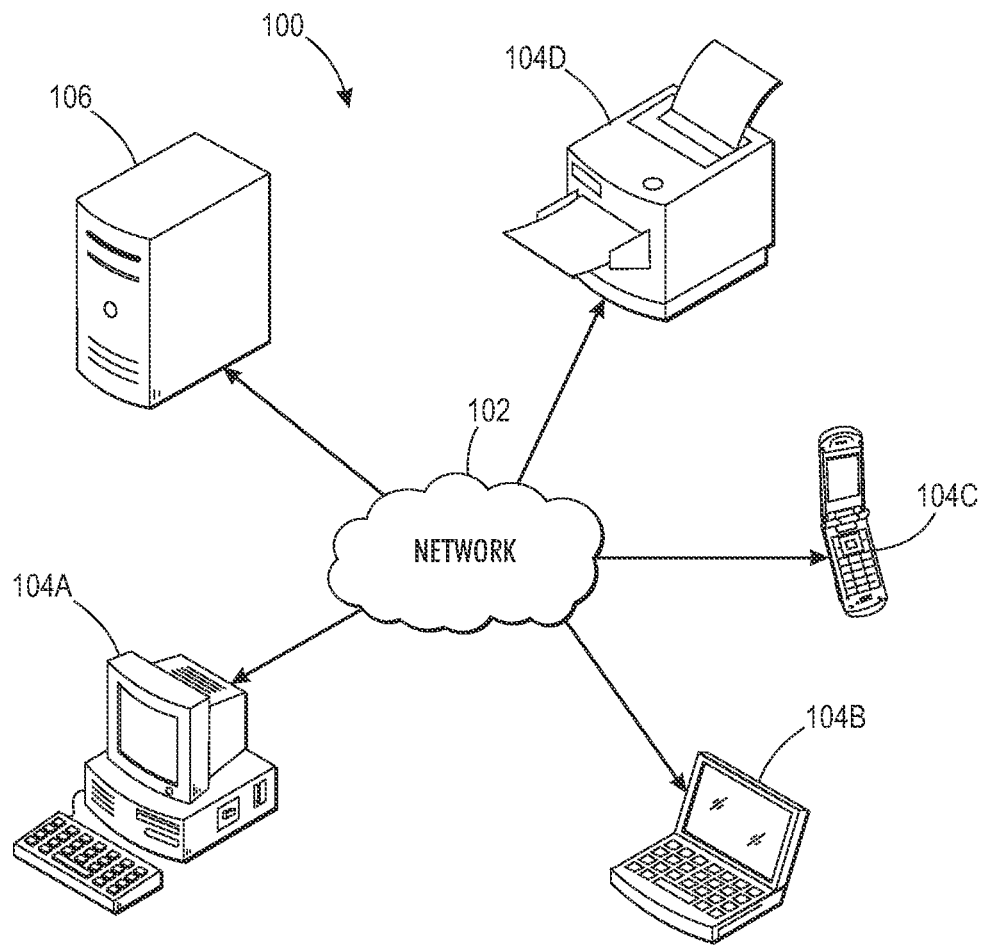
FIG. 1 is a block diagram illustrating a system environment in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown herein.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the respective meanings set forth below.

"Scanning" refers to a technique of recording an image as digital data in any format, thereby creating a file.

A "machine-readable code" (MRC) refers to a code that is readable by an electronic machine equipped with appropriate scanning apparatus and/or image processing algorithms. Examples of the MRC include, but are not limited to, a one-dimensional barcode, such as a Universal Product Code (UPC); a two-dimensional bar code, such as a Quick Response (QR) code and a High Capacity Color Barcode; a MaxiCode, and the like.

A "multifunction device" (MFD) refers to a device that may perform multiple functions. Examples of the functions include, but are not limited to, printing, scanning, copying, faxing, emailing, and the like.

An "electronic document" or "scanned document" refers to information recorded in a manner that requires a computing device or other electronic device to display, interpret, and process it. Electronic documents are intended to be used in either an electronic form or as printed output. In an embodiment, the electronic document includes one or more of text (handwritten or typed), image, symbols, and so forth. In an embodiment, the electronic document is obtained by scanning a document using a suitable scanner or an MFD. In an embodiment, the scanned document is a digital image. The digital image refers to a collection of data, including image data in any format, retained in an electronic form. The digital image may contain one or more pictorial, symbols, text, line art, blank, or non-printed regions, etc. The digital image may be stored in various file formats, such as, JPG or JPEG, GIF, TIFF, PNG, BMP, RAW, PSD, PSP, PDF, and the like. Hereinafter, the terms "electronic document", "scanned document", "image", and "digital image" are interchangeably used without deviating from the scope of ongoing description.

A "computing device" refers to a computer, a device including a processor/microcontroller and/or any other electronic component, device or system that performs one or more operations according to one or more programming instructions. Examples of the computing device include, but are not limited to, a desktop computer, a laptop, a personal digital assistant (PDA), a Smartphone, an MFD, and the like. The computing device is capable of accessing (or being accessed over) a network (e.g., using wired or wireless communication capabilities).

A "network" refers to a medium that interconnects a server and various computing devices. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

A "pre-assessment sheet" refers to a document containing one or more questions with one or more answer options for each of the one or more questions. The pre-assessment sheet may also be referred to as a question paper or a question sheet.

"First electronic document" refers to a scanned document obtained by scanning pre-assessment sheet.

A "master assessment sheet" contains same content as present in the pre-assessment sheet. The difference between the pre-assessment sheet and the master assessment sheet is that the master assessment sheet contains one or more markings around the one or more answer options. The one or more markings indicate one or more correct answers to the one or more questions. The one or more markings may be marked by a teacher/user. The master assessment sheet may also be referred to as an answer sheet. Therefore, the master assessment sheet and the answer sheet are used interchangeably hereinafter.

"Second electronic document" refers to a scanned document obtained by scanning master assessment sheet.

An "assessment sheet" refers to a printed document having one or more questions with one or more answer options and multiple portions of an MRC embedded at various locations. Basically, the assessment sheet is the print out of the pre-assessment sheet with the multiple portions of the MRC embedded at various locations. The assessment sheet may be provided by a teacher to a student/evaluatee so that the student/evaluatee may mark one or more answer options in the assessment sheet provided to him/her.

"Splitting" or "Splitting MRC" refers to breaking, dividing or separating the MRC into multiple parts.

"Embedding" refers to inserting, placing or putting so as to cause to be an integral part of a document.

FIG. 1 is a block diagram illustrating a system environment 100 in accordance with at least one embodiment. Various embodiments of methods and systems for creating and evaluating assessment sheets may be implemented in the system environment 100. The system environment 100 includes a network 102. The system environment 100 further includes a desktop computer 104A, a laptop 104B, a smart phone 104C, an MFD 104D, and a server 106.

A user operating the desktop computer 104A or the laptop 104B or the smart phone 104C is capable of accessing the MFD 104D and/or the server 106 through the network 102. A functionality of creating and evaluating assessment sheets may be implemented on at least one of the desktop computer 104A, the laptop 104B, the MFD 104D, and the server 106. In an embodiment, for example, the desktop computer 104A and/or the laptop 104B are capable of executing an application for creating and evaluating assessment sheets. In another embodiment, the application is hosted by the server 106 and the desktop computer 104A and/or the laptop 104B are capable of accessing the application over the network 102. In another embodiment, the MFD 104D is adapted to create and evaluate assessment sheets.

The MFD 104D is capable of printing electronic document(s) with embedded MRC. Further, the smart phone 104C and the MFD 104D are capable of scanning any document with embedded MRC.

In an embodiment, one or more of the desktop computer 104A, the laptop 104B, the smart phone 104C, the MFD 104D, and the server 106 may also be capable of executing an application for decoding the MRC present in a scanned document.

For an example, let us consider that a teacher (e.g., a user of the desktop computer 104A) wants to create assessment sheets to be distributed to various students. The teacher scans a pre-assessment sheet so as to generate an electronic document of the pre-assessment sheet. The pre-assessment sheet contains one or more questions with one or more answer options. The teacher then scans a master assessment sheet having one or more markings. The one or more markings correspond to one or more correct answers to one or more questions in the master assessment sheet. Thereafter, the desktop computer 104A running the application of creating the assessment sheets identifies the one or more markings and generates an MRC based on the one or more markings. The desktop computer 104A then splits the MRC into multiple portions and embeds the portions of the MRC at various locations in the electronic document. The teacher can then preview the electronic document and print multiple copies of the electronic document to create the assessment sheets. As mentioned above, the similar functionality of creating the assessment sheets can also be facilitated by the server 106 on the desktop computer 104A through a web based interface. Similarly, the laptop 104B or the MFD 104D can also be used by the teacher to create the assessment sheets.

Further, let us consider that the teacher distributed the assessment sheets to students and the students have provided their answers in the assessment sheets. Now in order to evaluate each of the assessment sheets provided by the students, the teacher scans each assessment sheet. The teacher also provides an authentication to decode the portions of the MRC embedded in each assessment sheet. Thereafter, the desktop computer 104A running the application of evaluating the assessment sheets identifies one or more markings provided by the students. The desktop computer 104A then compares the one or more markings provided by the students with the one or more markings present in the assessment sheet to generate result of evaluation. As mentioned above, the similar functionality of evaluating the assessment sheets can also be facilitated by the server 106 on the desktop computer 104A through a web based interface. Similarly, the laptop 104B or the MFD 104D can also be used by the teacher to evaluate the assessment sheets.

Figure 2:
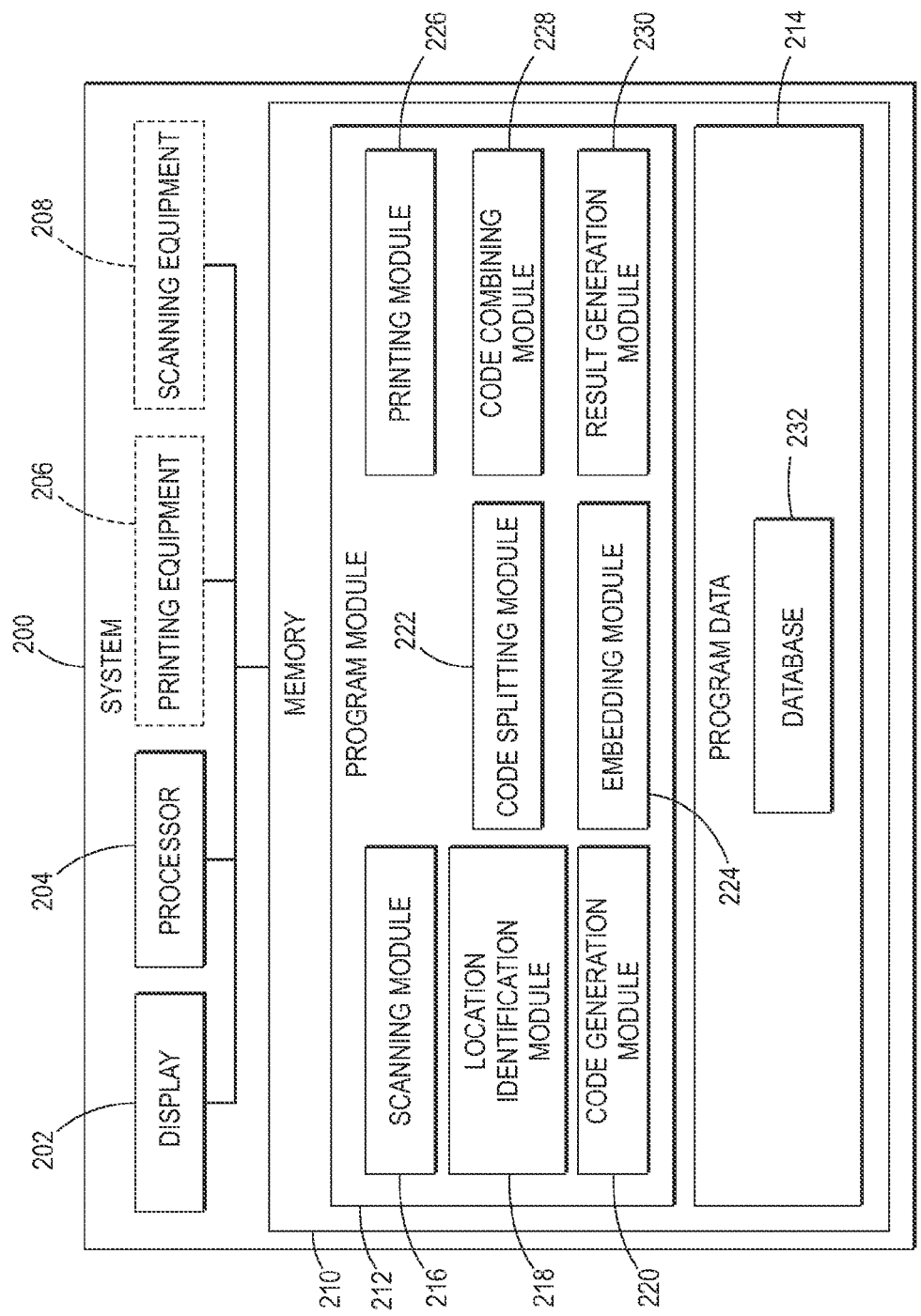
FIG. 2 is a block diagram illustrating a system for creating and evaluating a plurality of assessment sheets in accordance with at least one embodiment.

FIG. 2 is a block diagram illustrating a system 200 for creating and evaluating a plurality of assessment sheets in accordance with at least one embodiment. The system 200 corresponds to any of the desktop computer 104A, the laptop 104B, the smart phone 104C, or the MFD 104D. The system 200 includes a display 202, a processor 204, printing equipment 206 (optional), scanning equipment 208 (optional), one or more input medium (not shown) and a memory 210. For example, if the system 200 corresponds to the desktop computer 104A or the laptop 104B or the smart phone 104C, the printing equipment 206 and/or the scanning equipment 208 may not be present. If the system 200 corresponds to the MFD 104D, the printing equipment 206 and/or the scanning equipment 208 are present.

The display 202 facilitates a user to view information and interact with the system 200 in conjunction with various input mediums (not shown). The display 202 may be realized through several known technologies, such as Cathode Ray Tube (CRT) based display, Liquid Crystal Display (LCD), Light Emitting Diode (LED)-based display, Organic LED display technology, and Retina Display technology. Further, the display 202 may be a touch screen that receives a user input.

The processor 204 is coupled to the display 202, the printing equipment 206, the scanning equipment 208, one or more input mediums (not shown), and the memory 210. The processor 204 executes a set of instructions stored in the memory 210 to perform one or more operations on the system 200. The processor 204 may be realized through a number of processor technologies known in the art. Examples of the processor 204 include, but are not limited to, X86 processor, RISC processor, ASIC processor, CISC processor, or any other processor. In an embodiment, the processor 204 includes a Graphics Processing Unit (GPU) that executes the set of instruction to perform one or more image processing operations.

In an embodiment, the printing equipment 206 prints documents with embedded MRC. In an embodiment, the printing equipment 206 may receive a command from either of the desktop computer 104A or a laptop 104B to print a document embedded with an MRC. In an embodiment, the printing equipment 206 may utilize one or more printing technologies, such as, but are not limited to, laser printing, thermal printing, dot matrix printing, and ink-jet printing, to print the documents.

In an embodiment, the scanning equipment 208 is an optical device that scans a document to obtain an image of the document so as to generate an electronic document. In an embodiment, the scanning equipment 208 may utilize various image capturing techniques such as, but are not limited to, a charge-coupled device (CCD), complementary metal-oxide-semiconductor (CMOS), or a Contact Image Sensor (CIS), to scan the document. In an embodiment, the scanning equipment 208 implements a linear scanning technique. In another embodiment, the scanning equipment 208 implements a two-dimensional scanning technique.

The memory 210 stores a set of instructions (as a program module 212) and data (as a program data 214). Some of the commonly known memory implementations are, but not limited to, a random access memory (RAM), a read only memory (ROM), a hard disk drive (HDD), and a secure digital (SD) card. The program module 212 includes a set of instructions that is executable by the processor 204 to perform specific actions. It is understood by a person having ordinary skills in the art that the set of instructions works in conjunction with various hardware of the system 200 to perform various operations. The database 232 stores data submitted from and/or required by various modules of the program module 212. In an embodiment, the database 232 may be implemented using technologies including, but not limited to Oracle®, IBM DB2®, Microsoft SQL Server®, Microsoft Access®, PostgreSQL®, MySQL® and SQLite®, and the like.

The program module 212 includes a scanning module 216, a location identification module 218, a code generation module 220, a code splitting module 222, an embedding module 224, a printing module 226, a code combination module 228, and a result generation module 230. The program data 214 includes a database 232.

The scanning module 216 facilitates scanning through the scanning equipment 208 or MFD 104D. The scanning module 216 facilitates scanning of a pre-assessment sheet to obtain an image of the pre-assessment sheet so as to generate a first electronic document. The pre-assessment sheet contains one or more questions with one or more answer options. Therefore, the electronic document is the scanned version of the pre-assessment sheet containing one or more questions with one or more answer options. The scanning module 216 is also configured to scan a master assessment sheet to obtain an image of the master assessment sheet so as to generate a second electronic document. The master assessment sheet contains same content as is present in the pre-assessment sheet. The difference between the pre-assessment sheet and the master assessment sheet is that the master assessment sheet contains one or more markings around the one or more answer options. The one or more markings correspond to one or more correct answers to the one or more questions. In an embodiment, the one or more markings may be marked by a teacher.

The location identification module 218 is configured to determine one or more location identifiers of the one or more markings. In an embodiment, the one or more location identifiers are identified by performing an annotation lifting on a difference image. The difference image is an image obtained by comparing the second electronic document with the first electronic document. The one or more location identifiers of the one or more markings are referred to as one or more first location identifiers hereinafter. In an embodiment, the first location identifiers include X-Y coordinates corresponding to the one or more markings in the second electronic document. The X-Y coordinates in the second electronic document are calculated based on the pixel size and/or location of each of the pixel in the one or more markings. The location identification module 218 then stores the identified first location identifiers into the database 232.

The code generation module 220 obtains the first location identifiers from the location identification module 218. The code generation module 220 is configured to generate an MRC based on the first location identifiers. The MRC may be generated by various techniques known in the art, including, but not limited to, 2D barcode VCL components in Delphi or C++ builder applications, J4L components, and Google Chart Tools (Chart API) using HTTP Post or Get methods, an online application/tool, such as KAYWA, and the like. However, a person having ordinary skill in the art would understand that the techniques mentioned for generating the MRC are for illustrative/example purposes and any suitable MRC generating technique may be used without departing from the scope of the invention. For example, the MRC (e.g., a QR code) is generated based on the first location identifiers of the one or more markings in the electronic document. The MRC thus generated encodes the one or more first location identifiers. Once the MRC is generated, the code generation module 220 stores the MRC in the database 232.

The code splitting module 222 receives the generated MRC from the database 232. The code splitting module 222 splits the received MRC code into various portions. The code splitting module 222 stores the various portions of the MRC in the database 232. In an embodiment, an image of the MRC is split in to multiple small sized portions by the code splitting module 222. In this case, any known technique of image splitting/cropping can be implemented by the code splitting module 222.

The embedding module 224 obtains the portions of the MRC from the database 232 and embeds the portions of the MRC at various locations in the first electronic document. In an embodiment, the embedding module 224 determines various positions of the portions of the MRC on the first electronic document based on the size of the portions of the MRC and empty space available in the first electronic document. The embedding module 224 then stores the first electronic document with the embedded MRC in the database 232. For example, the portions of the MRC can be positioned on the border of the first electronic document (as shown in FIG. 4(F), marked by 424).

The printing module 226 obtains the first electronic document with the embedded MRC (in distributed form) from the database 232 and facilitates printing of the first electronic document with the MRC to generate a plurality of assessment sheets. The first electronic document is printed depending on the user's command for printing the first electronic document. On receiving the user's command for printing, the printing module 226 initiates the printing of the first electronic document having the MRC through the printing equipment 206 or by sending printing commands to the MFD 104D.

After the first electronic document is printed to generate the plurality of assessment sheets, the assessment sheets are distributed to the students/evaluatees. The students/evaluatees provide their answers in the assessment sheets provided to them. The answers are represented by one or more markings in the assessment sheet.

The scanning module 216 is further configured to facilitate scanning of the each of the assessment sheets with the one or more markings so as to generate a third electronic document.

The code combining module 228 facilitates combining of the plurality of portions of the MRC embedded at various locations in each of the scanned assessment sheets based on an authentication. The authentication may include, but not limited to, a password, a public-private key authentication, a biometric authentication, a voice authentication, or any known authentication means. On verifying the authentication, the code combining module 228 decodes the combined MRC to obtain the one or more first location identifiers. In an embodiment, the code combining module 228 determines the one or more first location identifiers based on the decoded MRC. In order to decode the MRC, the code combining module 228 implements various code decoding techniques such as various barcode decoding techniques, QR code decoding techniques, MaxiCode decoding techniques, and the like.

The location identification module 218 is further configured to determine one or more location identifiers of one or more markings in the third electronic document. The one or more location identifiers of the one or more markings in the third electronic document are referred to as one or more second location identifiers hereinafter. In an embodiment, the one or more markings in the assessment sheets are indicative of one or more answers provided by the student (evaluatee). In an embodiment, the second location identifiers include the X-Y coordinates corresponding to the one or more markings in the third electronic document. The X-Y coordinates in the assessment sheets are calculated based on the pixel size and/or location of each of the pixel in the one or more markings. The location identification module 218 then stores the identified second location identifiers into the database 232.

The result generation module 230 is configured to provide the result of the evaluation of each of the assessment sheets. The result generation module 230 receives the one or more first location identifiers and the one or more second location identifiers from the database 232. Thereafter, the result generation module 230 compares the one or more second location identifiers with the one or more first location identifiers. Based on the comparison, the result of the evaluation is provided to the student (evaluatee). In an embodiment, if the one or more second location identifiers lie within the range of the one or more first location identifiers, the answer is marked as correct. In another embodiment, if the one or more second location identifiers do not lie in the range of the one or more first location identifiers, the answer is marked as incorrect. In yet another embodiment, the answer is marked as incorrect if the one or more second location identifiers overlap with one or more co-ordinates of neighboring answers or not. The result generation module then collates the result and provides the result to the student (evaluatee).

Figure 3:
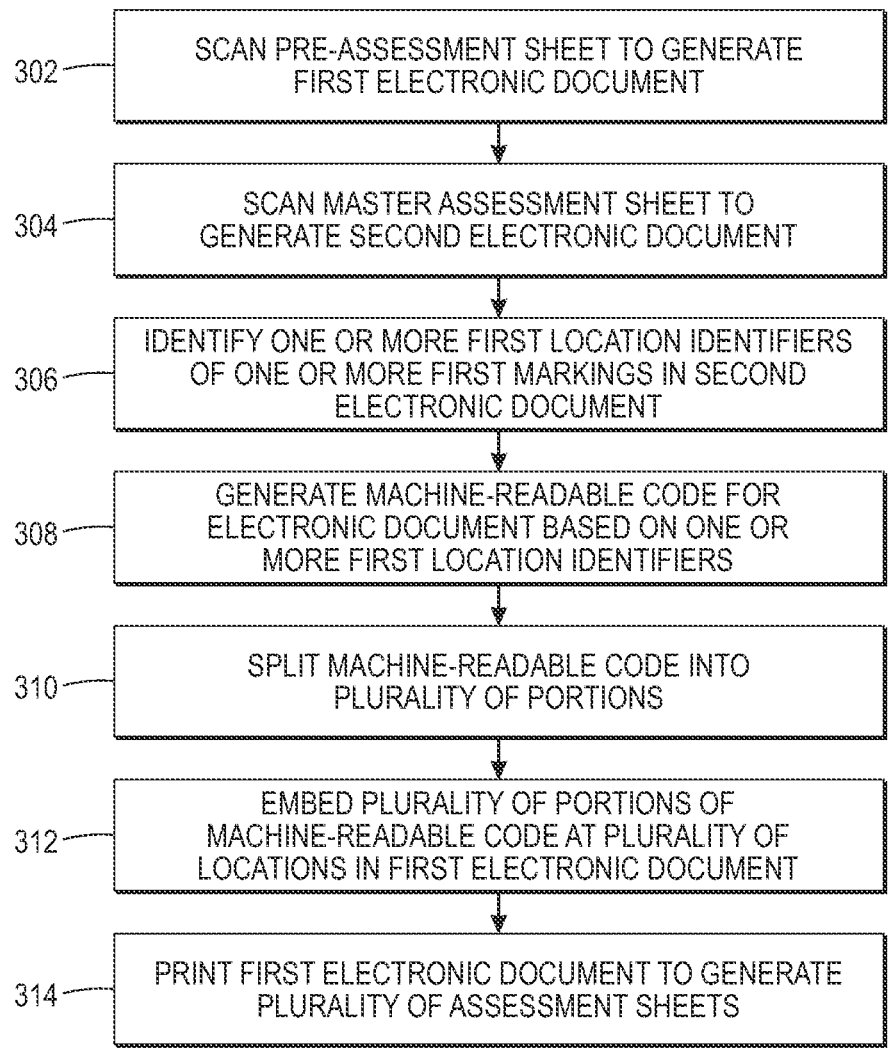
FIG. 3 is a flowchart illustrating a method for creating assessment sheets in accordance with at least one embodiment.

FIG. 3 is a flowchart illustrating a method 300 for creating assessment sheets in accordance with at least one embodiment. FIG. 3 is explained in conjunction with FIG. 1 and FIG. 2.

At step 302, a pre-assessment sheet is scanned to generate a first electronic document (e.g., scanned document). The pre-assessment sheet contains one or more questions with one or more answer options. Therefore, the first electronic document is the scanned copy of the pre-assessment sheet containing one or more questions with one or more answer options. In an embodiment, the scanning is facilitated by the scanning module 216. In an embodiment, the step 302 is optional. For example, if a user wants to use an existing electronic document (e.g., an electronic document saved on the system 200), there is no need for scanning and, hence, the step 302 may be avoided. In an embodiment, a user may be provided with a graphical user interface (GUI) for assisting the user for the creation of the first electronic document.

Figure 4A:
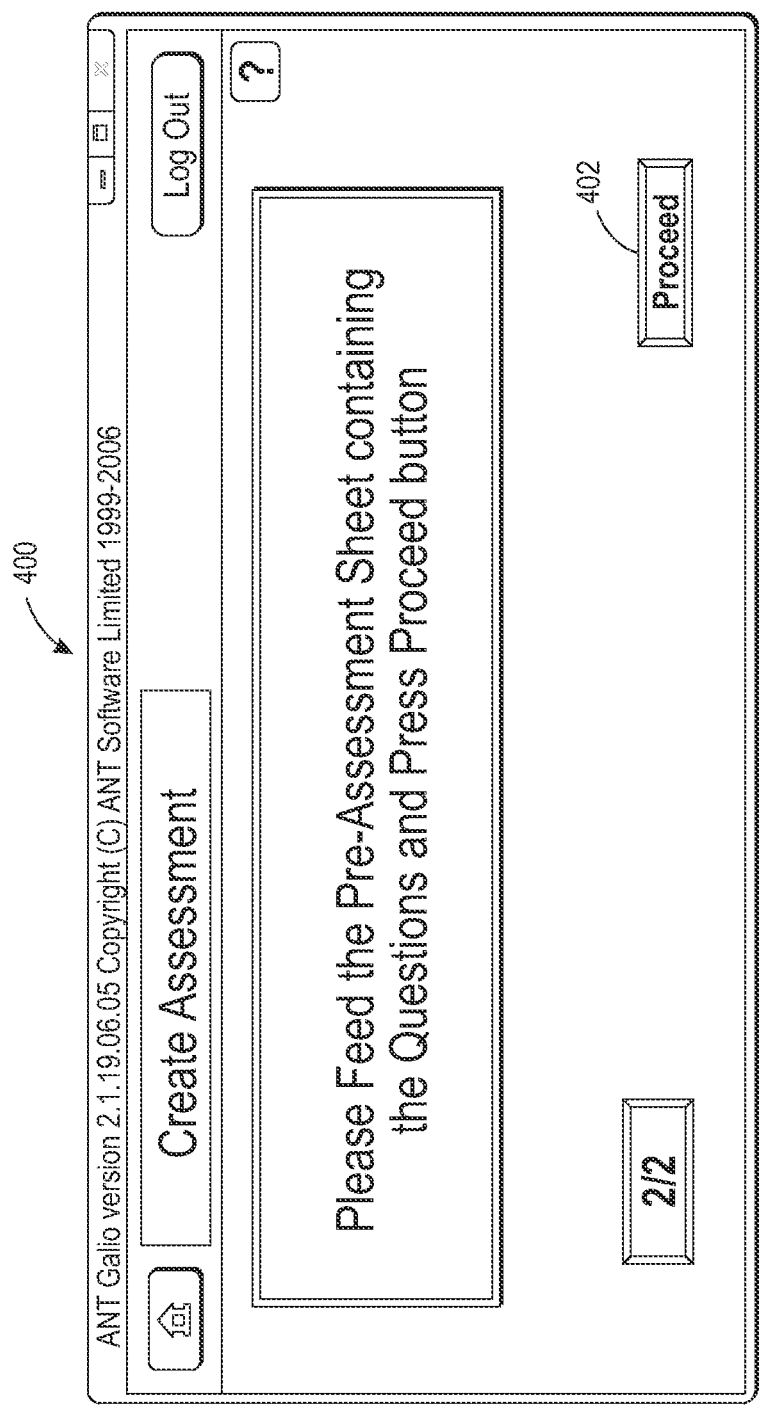
FIG. 4A illustrates a GUI presented to a user for feeding a pre-assessment sheet containing one or more questions with one or more answer options in accordance with at least one embodiment.

FIG. 4A illustrates a GUI 400 presented to a user for feeding a pre-assessment sheet containing one or more questions with one or more answer options in accordance with at least one embodiment. The GUI 400 requests the user to feed the pre-assessment sheet containing the one or more questions with one or more answer options and press the proceed button 402 on the GUI 400.

Figure 4B:
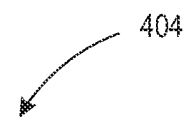
FIG. 4B illustrates a pre-assessment sheet containing one or more questions with one or more answer options to be fed by a user in accordance with at least one embodiment.

FIG. 4B illustrates a pre-assessment sheet 404 containing one or more questions with one or more answer options fed by a user in accordance with at least one embodiment. The user feeds the pre-assessment sheet 404 and presses the proceed button 402. In an embodiment, the user scans the pre-assessment sheet 404 using the scanning equipment 208. In another embodiment, the user may feed in a pre-assessment sheet already stored in the database 232. In both the embodiments, the resulting document is referred to as the first electronic document.

At step 304, a master assessment sheet is scanned to generate a second electronic document (e.g., scanned document). In an embodiment, the scanning is facilitated by the scanning module 216. In an embodiment, the step 304 is optional. For example, if the user wants to use an existing electronic document (e.g., an electronic document saved on the system 200), there is no need for scanning and, hence, the step 304 may be avoided. In an embodiment, a user may be provided with a graphical user interface (GUI) for assisting the user for the creation of the second electronic document.

Figure 4C:
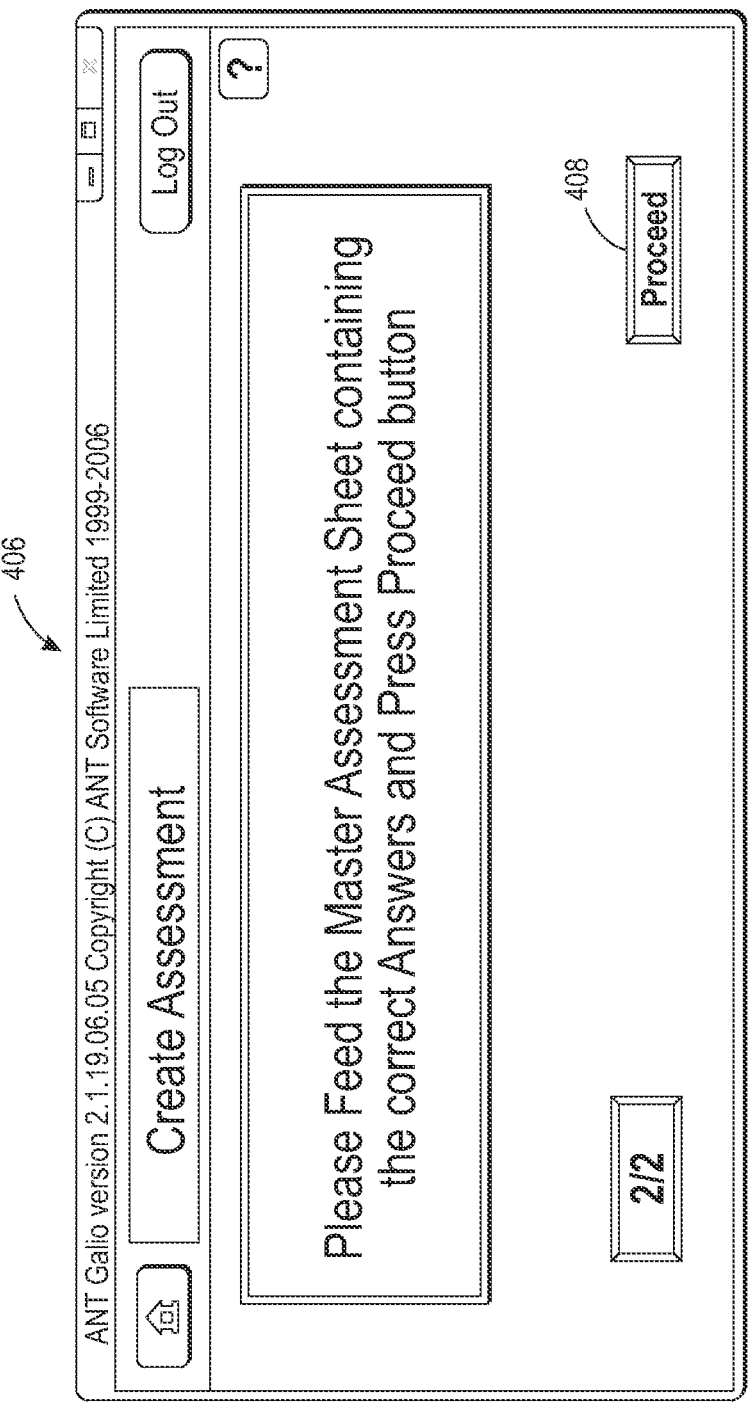
FIG. 4C illustrates a GUI presented to a user for feeding a master assessment sheet in accordance with at least one embodiment.

FIG. 4C illustrates a GUI 406 presented to a user for feeding a master assessment sheet in accordance with at least one embodiment. The GUI 406 requests the user to feed the master assessment sheet and press the proceed button 408.

FIG. 4D illustrates a master assessment sheet 410 provided by a user in accordance with at least one embodiment. The user feeds the master assessment sheet 410 and presses the proceed button 408. In an embodiment, the user scans the master assessment sheet 410 using the scanning equipment 208. In another embodiment, the user may feed in a master assessment sheet already stored in the database 232. In both the embodiments, the resulting document is referred to as the second electronic document. The master assessment sheet 410 includes one or more markings 412 that represent one or more correct answers to the one or more questions.

At step 306, one or more location identifiers corresponding to the one or more markings 412 are identified. The one or more location identifiers are referred to as the one or more first location identifiers. In an embodiment, the location identifiers are determined by the location identification module 218. Instead of checking all the fields on the master assessment sheet 410, only the fields marked by the user are identified via the coordinates of the marked fields. In an embodiment, the one or more first location identifiers correspond to one or more X-Y coordinates. In an embodiment, the one or more X-Y coordinates are identified by performing an annotation lifting on a difference image. The difference image is an image obtained by comparing the second electronic document with the first electronic document. The difference between the second electronic document and the first electronic document provides the coordinates of the one or more first location identifiers.

Figure 4E:
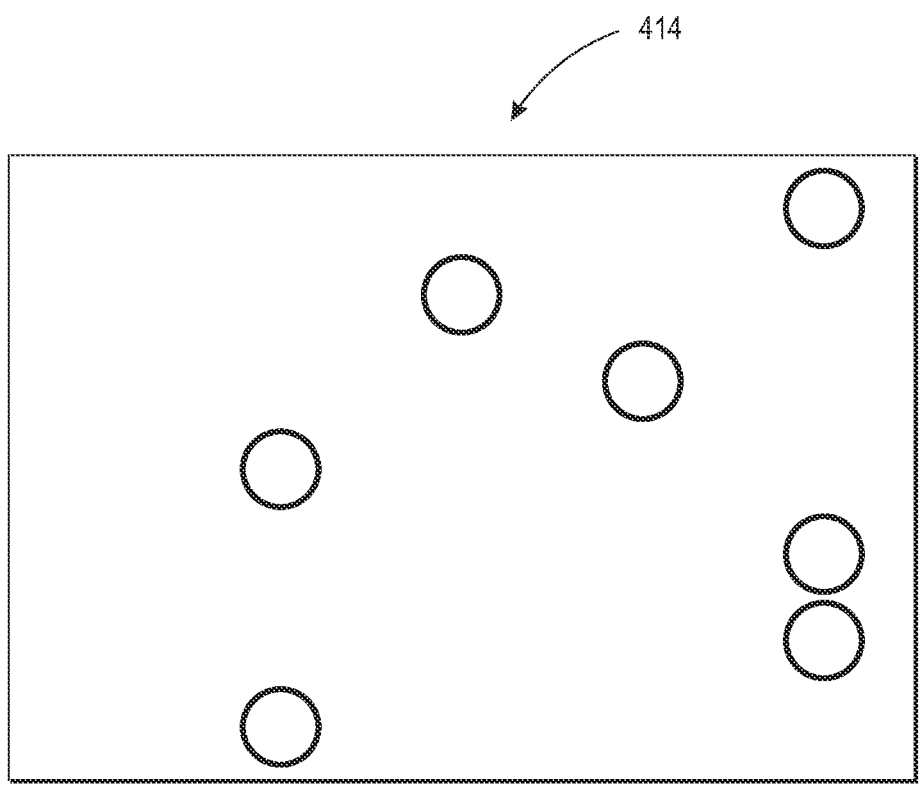
FIG. 4E illustrates a difference image obtained by comparing a first electronic document with a second electronic document in accordance with at least one embodiment.
Figure 4F:
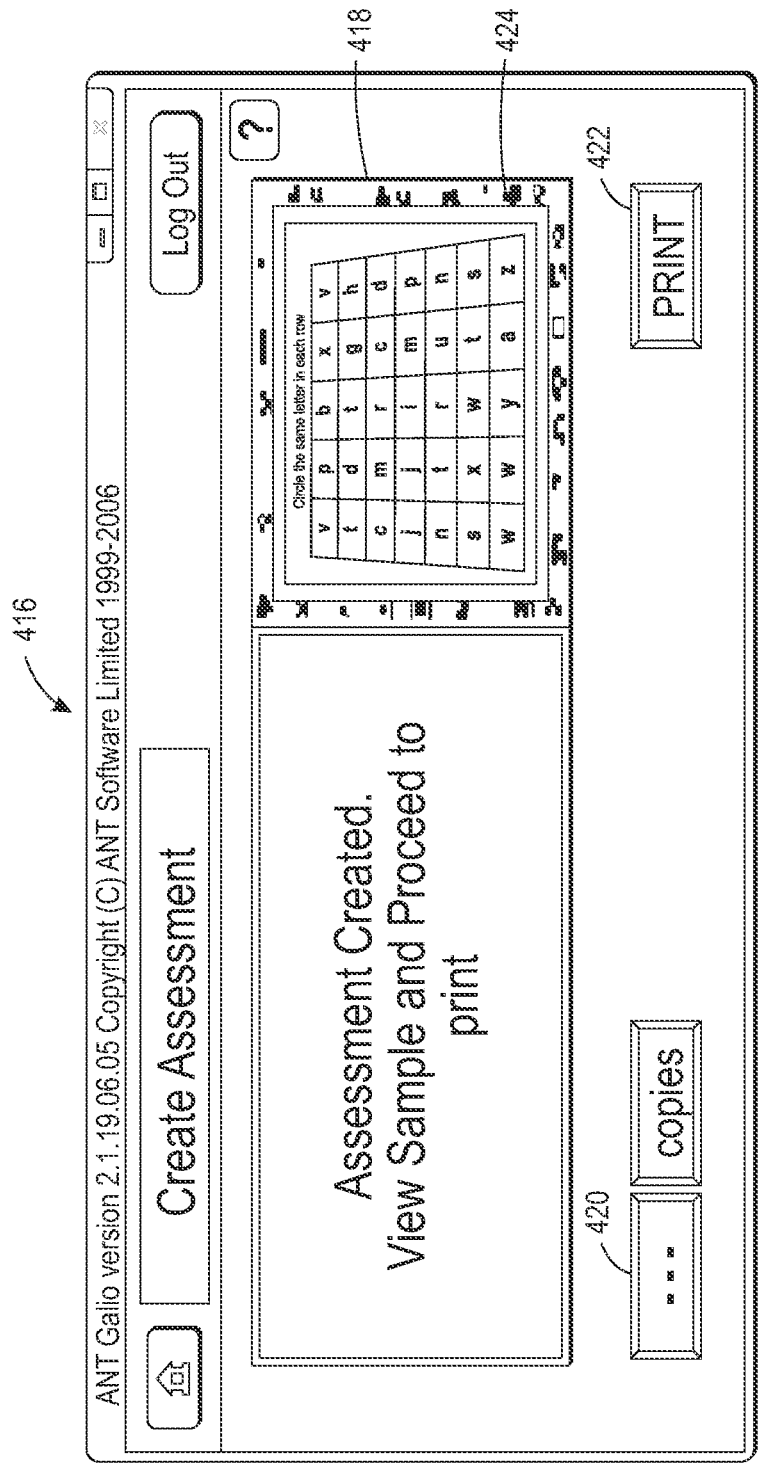
FIG. 4F illustrates a GUI presented to a user to preview a first electronic document with embedded MRC and proceed with printing of the first electronic document with embedded MRC in accordance with at least one embodiment.

FIG. 4E illustrates a difference image 414 obtained by comparing the first electronic document with the second electronic document in accordance with at least one embodiment. The location identification module 218 derives the coordinate information from the difference image 414. In an embodiment, the coordinates may look like this: [{7/34, 9/39} {9/14, 11/19} . . . ]. Each set contains the coordinates of each of the one or more markings 412. The complete set represents all the possible correct answers to the one or more questions.

At step 308, the MRC is generated by the code generation module 220 based on the one or more first location identifiers. The MRC includes the coordinate locations of the one or more markings 412 in an encoded format.

At step 310, the MRC is split into a plurality of portions by the code splitting module 222. In an embodiment, an image of the MRC is split in to multiple small sized portions by the code splitting module 222. In this case, any known technique of image splitting/cropping can be implemented by the code splitting module 222.

At step 312, the portions of the MRC are embedded at various positions in the first electronic document. The position where each of the portions of the MRC is to be placed in the first electronic document is determined by the embedding module 224. Once the position is decided, each of the portions of the MRC is embedded in the first electronic document at the position determined for it.

At step 314, the first electronic document is printed with the portions of the MRC embedded in it to generate the plurality of the assessment sheets. In an embodiment, the printing of the first electronic document is facilitated by the printing module 226. In an embodiment, once the portions of the MRC are embedded in to the first electronic document, the user may be presented with a GUI to preview the first electronic document with embedded MRC and proceed with the printing.

FIG. 4F illustrates a GUI 416 presented to a user to preview a first electronic document with embedded MRC and proceed with printing of the first electronic document with embedded MRC in accordance with at least one embodiment. The user is able to preview the first electronic document with embedded MRC in a preview window 418. The user is also allowed to input the number of copies required of the first electronic document. The user can input the required number at 420 and proceed with the printing by pressing the print button 422. On pressing the print button 422, the user gets the number of assessment sheets as mentioned at 420.

In an embodiment, multiple copies of the assessment sheets having the MRC (in distributed form) are printed and provided to the evaluatees/students for filling their personal details and answers to questions contained in the assessment sheets. For instance, each student enters the personal details, such as name, class, roll number, subject, and email, on the assessment sheet provided to him/her. Also, each student answers the questions asked in the assessment sheet by marking one or more answer options provided against each question. Each student answers the questions by providing one or more marking in the assessment sheet.

After the students have provided their answers in the assessment sheets provided to them, the next step is to provide the evaluation of the assessment sheets to each student/evaluatee. Such scenario is described in conjunction with FIG. 5.

Figure 5:
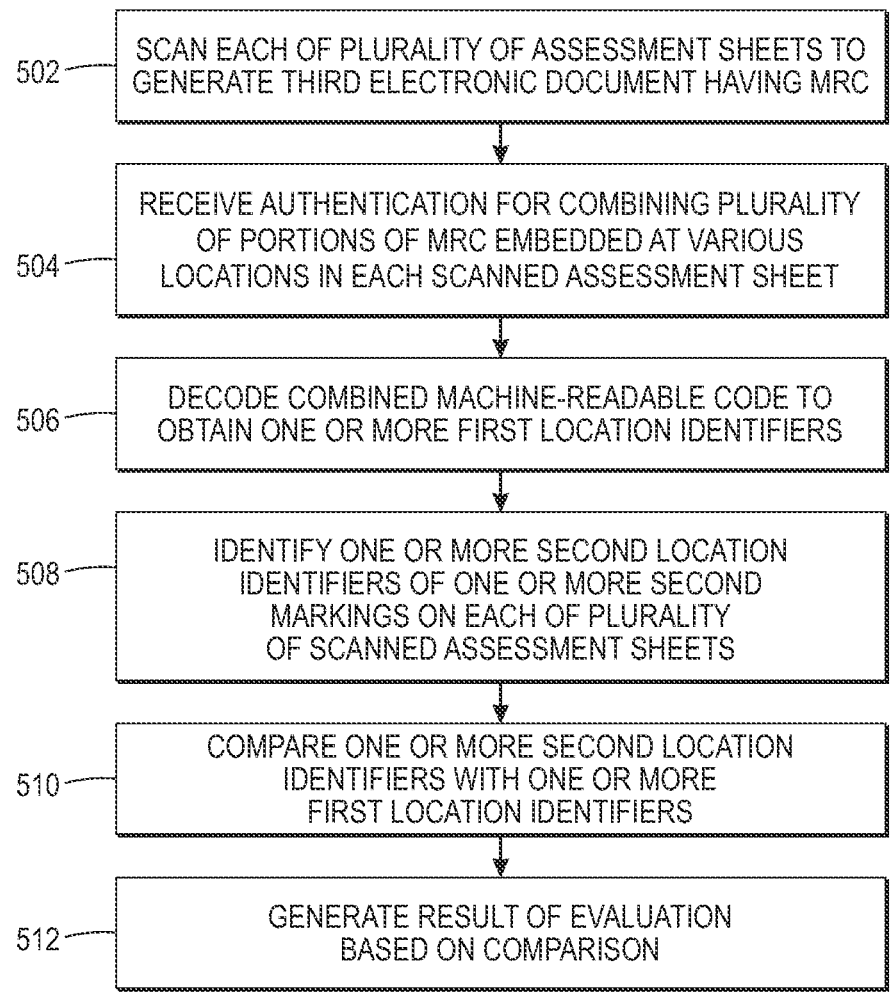
FIG. 5 is a flowchart illustrating a method for evaluating assessment sheets in accordance with at least one embodiment.

FIG. 5 is a flowchart illustrating a method for evaluating assessment sheets in accordance with at least one embodiment.

At step 502, an assessment sheet (e.g., printed document with MRC) is scanned to generate a third electronic document having embedded MRC. Therefore, the third electronic document is the scanned copy of the assessment sheet. In an embodiment, the scanning module 216 scans the assessment sheet. In an embodiment, if the user is using the desktop computer 104A or the laptop 104B, the user can scan the assessment sheet using the scanning equipment 208 or the MFD 104D. In another embodiment, if the user is using the smart phone 104C, the user can scan the assessment sheet using a camera of the smart phone 104C. In yet another embodiment, the assessment sheet can be directly fed into the MFD 104D for scanning the assessment sheet. The assessment sheet includes one or more questions with one or more answer options. The answers to the questions are provided by marking the one or more answer options against each question in each of the assessment sheets. It may be noted that any shape or any known method of marking answer options may be used without departing from the scope of the invention.

Figure 6A:
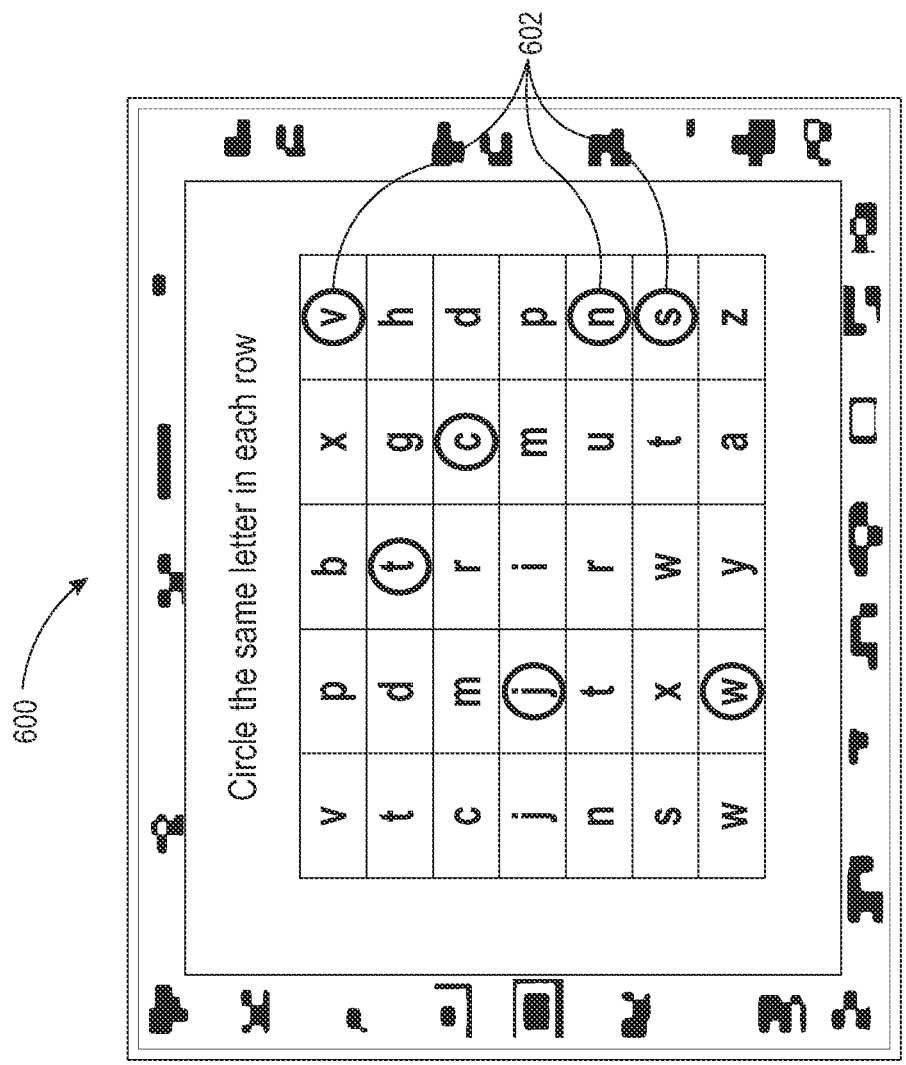
FIG. 6A illustrates an assessment sheet with one or more markings around one or more answer options for a question in the assessment sheet in accordance with at least one embodiment.

FIG. 6A illustrates an assessment sheet 600 with one or more markings 602 around one or more answer options for a question in the assessment sheet in accordance with at least one embodiment. The one or more markings 602 represent the answers provided by the evaluatee/student.

At step 504, the user/teacher is requested to enter an authentication for combining the plurality of portions of the MRC embedded at the various locations in each of the scanned assessment sheets. In an embodiment, the authentication may be provided by a teacher. In another embodiment, the authentication information may be provided by a teacher to a student/evaluatee. In such a case, the student/evaluatee may provide the authentication information for performing self-evaluation. The authentication may include, but not limited to, a password, a public-private key authentication, a biometric authentication, or a voice authentication. Verification of the authentication is performed by the code combining module 228. The code combining module 228 receives the authentication from the user and compares the received authentication with the authentication already stored in the database 232. If the authentication provided by the user matches with the authentication stored in the database 232, the process follows. Else, the user is provided with an error message.

At step 506, the code combining module 228 decodes the combined MRC embedded in the scanned assessment sheet to obtain the one or more first location identifiers. In an embodiment, the code combining module 228 determines the one or more first location identifiers based on the decoded MRC.

At step 508, one or more second location identifiers corresponding to the one or more markings 602 on the assessment sheet 600 are identified. In an embodiment, the location identifiers are determined by the location identification module 218. Instead of checking all the fields on the assessment sheet 600, only the fields marked by the evaluatee/student are identified via the coordinates of the marked fields. In an embodiment, the one or more second location identifiers correspond to one or more X-Y coordinates. In an embodiment, the one or more the X-Y coordinates are identified by performing annotation lifting on a difference image. The difference image is an image obtained by comparing the assessment sheet 600 with the pre-assessment sheet 404. The difference between the assessment sheet 600 and the pre-assessment sheet 404 provides the coordinates of the one or more second location identifiers.

Figure 6B:
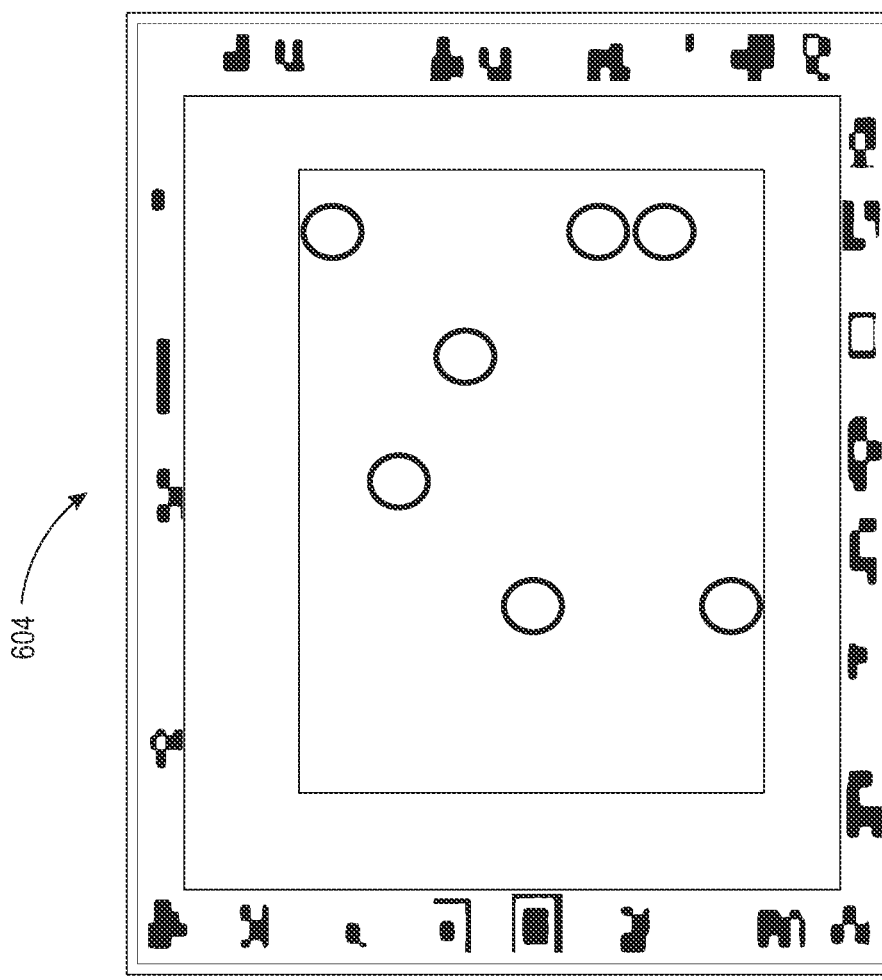
FIG. 6B illustrates a difference image obtained by comparing an assessment sheet with a pre-assessment sheet in accordance with at least one embodiment.

FIG. 6B illustrates a difference image 604 obtained by comparing the assessment sheet 600 with the pre-assessment sheet 404 in accordance with at least one embodiment. The location identification module 218 derives the coordinate information from the difference image 604. In an embodiment, the coordinates may look like this: [{7/34, 9/39} {9/14, 11/19} . . . ]. Each set contains the coordinates of each of the one or more markings 602. The complete set represents all the answers provided by the evaluatee/student to the one or more questions.

At step 510, the one or more second location identifiers are compared with the one or more first location identifiers. The comparison is performed by the result generation module 230.

At step 512, the result generation module 230 provides the result of the evaluation of the assessment sheet based on the comparison. In an embodiment, if the one or more second location identifiers lie within the range of the one or more first location identifiers, the answer is marked as correct. In another embodiment, if the one or more second location identifiers do not lie in the range of the one or more first location identifiers, the answer is marked as incorrect. In yet another embodiment, the result generation module 230 also checks whether the one or more second location identifiers overlap with one or more co-ordinates of neighboring answers or not. This is done by comparing the one or more second location identifiers with the one or more location identifiers of the answers surrounding the correct answer. Accordingly, the result generation module 230 marks the answer as correct if the one or more second location identifiers lie in the range of the one or more first location identifiers and the one or more second location identifiers do not intrude into the coordinates of the neighboring answers. This is required in a case, for example, when a student draws big circles on answers that intrude into the coordinate position of other neighboring answers. The intrusion may include, but not limited to, vertical, horizontal, diagonal, or irregular intrusions.

Figure 6C:
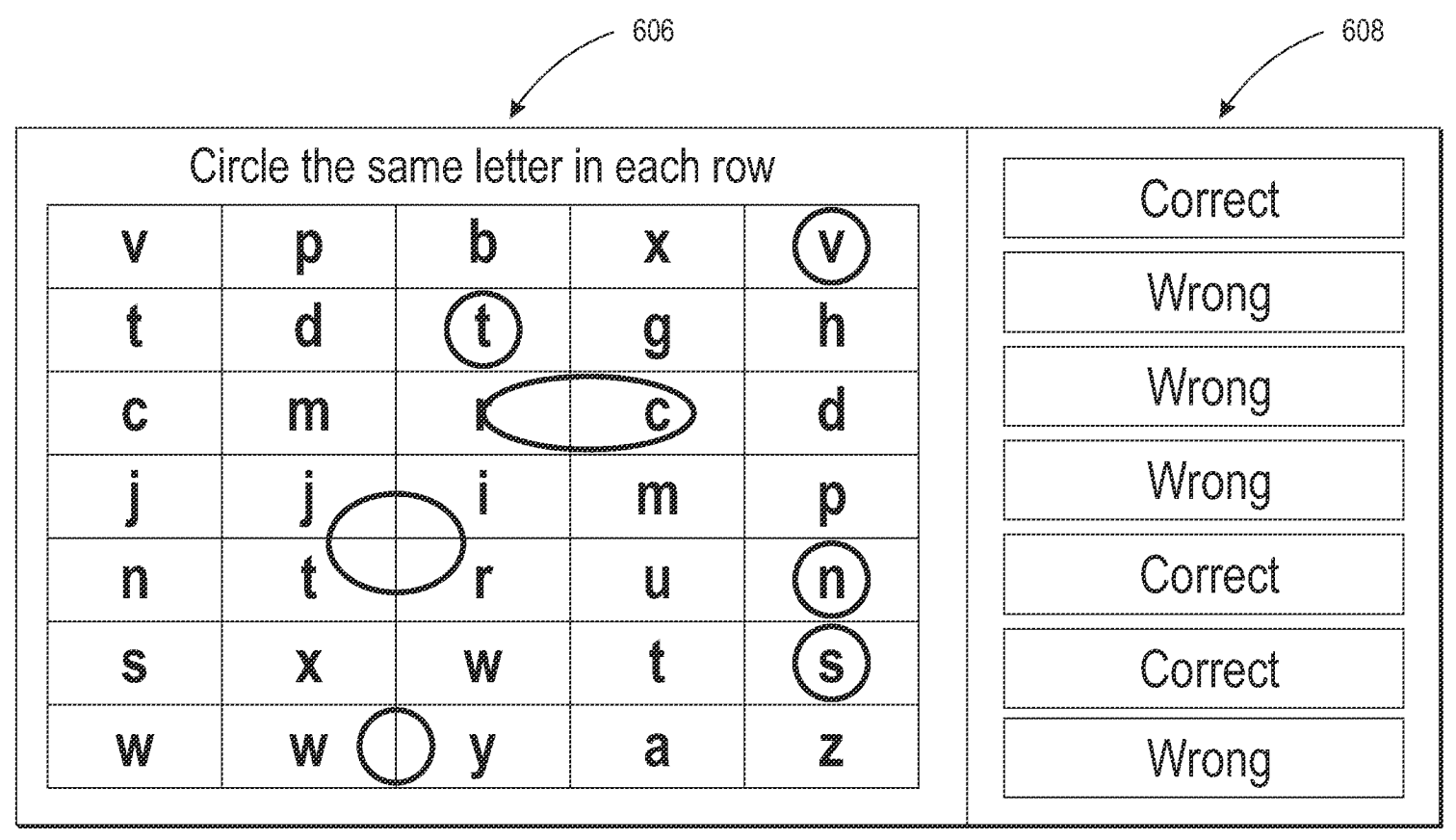

FIG. 6C illustrates an example of an assessment sheet 606 with evaluation results 608.

The result generation module 230 then collates the result and provides the result to the evaluatee/student.

Figure 7A:
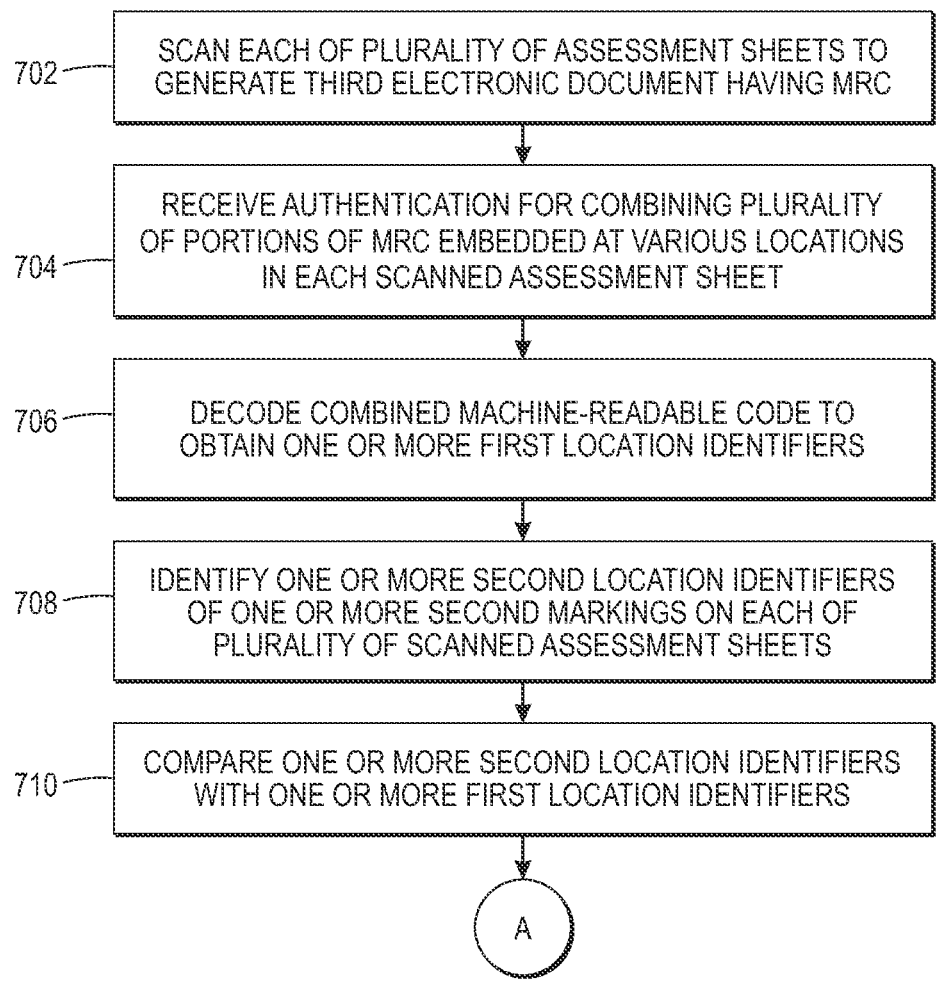
FIG. 7A and FIG. 7B illustrate a method for evaluating assessment sheets in accordance with another embodiment.
Figure 7B:
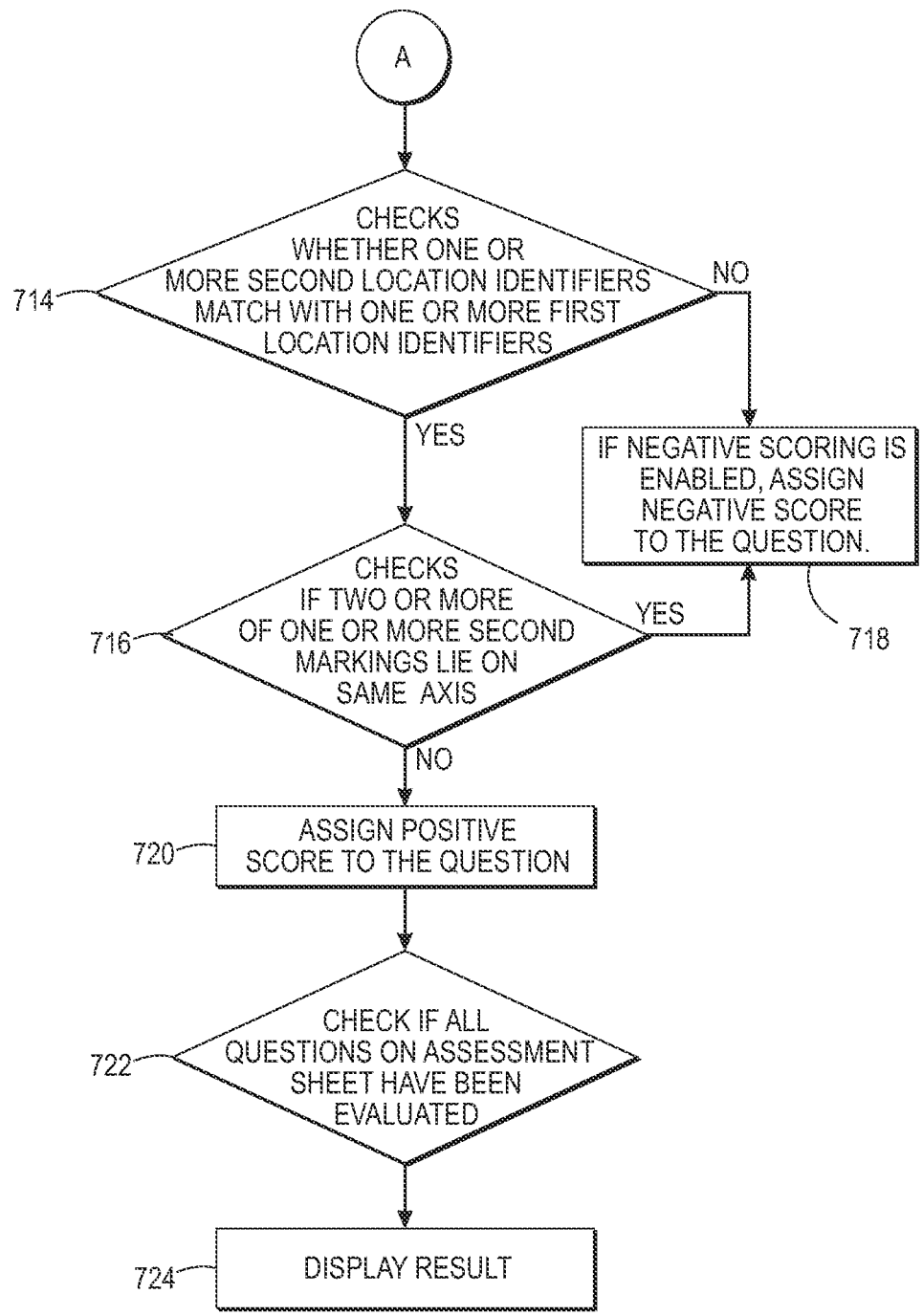

FIG. 7A and FIG. 7B illustrate a method for evaluating assessment sheets in accordance with another embodiment.

The steps 702-708 are similar to steps 502-508 as described in FIG. 5. Therefore, the steps 702-708 have not been described for brevity purposes.

At step 710, the one or more second location identifiers are compared with the one or more first location identifiers. The comparison is performed by the result generation module 230.

At step 714, the result generation module 230 checks whether the one or more second location identifiers match with the one or more first location identifiers. If the one or more second location identifiers match with the one or more first location identifiers, then step 716 is executed. Else, step 718 is executed.

At step 716, the result generation module 230 checks if two or more of the one or more second markings lie on a same axis. If the two or more of the one or more second markings lie on the same axis, then step 718 is executed. Else, step 720 is executed.

At step 718, the result generation module 230 checks if a negative scoring is enabled. If the negative scoring is enabled, the result generation module 230 assigns a negative score to the question.

At step 720, the result generation module 230 assigns a positive score to the question.

At step 722, the result generation module 230 checks if all the questions on the assessment sheet have been evaluated. If any question is left, the process starts from the step 714 again. Else, step 724 is executed.

At step 724, the result of evaluation is presented to the evaluatee/student on the display 202.

The above embodiments are described for a single question having a single answer in each of the assessment sheets. However, it may be noted that similar embodiments may be applicable for a single question having multiple answers, without departing from the scope of the invention. In an embodiment, the result generation module 230 may assign a positive score to the question if all options of the multiple answers are correct. In another embodiment, the result generation module 230 may assign a positive score to the question if any one of the multiple embodiments is correct. In yet another embodiment, the result generation module 230 may assign half of the score as positive score to the correct answers and half of the score as negative score to the incorrect answers.

Further, the negative score and the positive score as described in the above embodiments may include, but not limited to, a similar score or a variable score. The similar score may include, but not limited to, assigning a same number to all the questions. For example, all the questions may be assigned a score of 2. The variable score may include, but not limited to, assigning a number to a first set of questions and another number to a second set of questions. For example, if the assessment sheet has 10 questions, then a score of 2 may be assigned to the first 5 questions and a score of 4 may be assigned to the next 5 questions. In an embodiment, the information about the similar score or the variable score may be stored in the MRC. In another embodiment, the information about the similar score or the variable score may be assigned by an external system.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive and an optical-disk drive. The storage device may also be a means of loading computer programs or other instructions into the computer system. The computer system also includes a communication unit. The communication unit allows the computer to connect to other databases and the Internet through an Input/output (I/O) interface, allowing the transfer and reception of data from other databases. The communication unit may include a modem, an Ethernet card, or other similar devices, which enable the computer system to connect to databases and networks, such as LAN, MAN, WAN, and the Internet. The computer system facilitates inputs from a user through input device, accessible to the system through an I/O interface.

The computer system executes a set of instructions, which are stored in one or more storage elements, to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in the computers. The instructions for the disclosure can be written in all the programming languages including, but not limited to, 'C,' 'C++,' 'Visual C++,' and 'Visual Basic.' Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various the operating systems and platforms including, but not limited to, 'Unix,' 'DOS,' 'Android,' 'Symbian;' and 'Linux.'

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, time saving and simplicity in operation. Manual evaluation of the assessment sheets may be avoided resulting in a speedy, yet easy, process. Additionally, the MRC, such as the QR code, serves as an origin or reference for the correct answers. Splitting of the MRC into multiple portions and scattering the portions at various locations on the assessment sheet helps to have a secure and tamper proof assessment sheets. Further, the decoding of the MRC results in the location identifiers of the correct answers. The decoded information (e.g., the location identifiers obtained by decoding of the MRC) will then be useful for evaluating the answers provided by the evaluatee/student. Furthermore, based on the evaluation, the evaluatee/student is also provided with a comprehensive report of errors and further learning tips of improvement.

Further, it is easier to customize assessment sheets and have them evaluated. Questions and answers in the assessment sheets may be easily jumbled and the MRC can be accordingly adjusted and printed. This helps to customize the assessment sheets and avoids chances of cheating among the evaluatees/students. Also, the assessment sheets in any language can be evaluated as the evaluation is provided based on the matching of the coordinates.

Various embodiments of the methods and systems for creating and evaluating assessment sheets have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules, and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for creating a plurality of assessment sheets, the method comprising:
   identifying, by a processor, one or more first location identifiers of one or more first markings in a scanned master assessment sheet, wherein the one or more first markings are indicative of correct answers of one or more questions in the scanned master assessment sheet;
   generating, by the processor, a machine-readable code, to be embedded in a scanned pre-assessment sheet, based on the one or more first location identifiers of the one or more first markings, indicative of the correct answers, identified in the scanned master assessment sheet;
   splitting, by the processor, the machine-readable code into a plurality of portions; and
   embedding, by the processor, the plurality of portions of the machine-readable code at a plurality of locations in the scanned pre-assessment sheet.

2. The method of claim 1, further comprising printing the scanned pre-assessment sheet after the embedding to create the plurality of assessment sheets.

3. The method of claim 1, wherein the identifying of the one or more first location identifiers comprises determining coordinates of the one or more first markings.

4. The method of claim 1, wherein the one or more first location identifiers correspond to one or more X-Y coordinates.

5. The method of claim 1, wherein the machine-readable code corresponds to at least one of a Universal Product Code (UPC), a high capacity color barcode, a Quick Response (QR) code, or a MaxiCode.

6. The method of claim 1, wherein each of the plurality of assessment sheets comprises the plurality of portions of the machine-readable code.

7. The method of claim 6, further comprising evaluating, by the processor, each of the plurality of assessment sheets, wherein each of the plurality of assessment sheets comprises one or more second markings.

8. The method of claim 7, wherein the one or more second markings correspond to one or more answers provided by an evaluatee.

9. The method of claim 8, wherein the evaluation comprises scanning each of the plurality of assessment sheets filled by the evaluatee.

10. The method of claim 9, wherein the evaluation further comprises combining, by the processor, the plurality of portions of the machine-readable code embedded at the plurality of locations in each of the plurality of scanned assessment sheets based on an authentication.

11. The method of claim 10, wherein the authentication comprises at least one of a password, a public-private key authentication, a biometric authentication, or a voice authentication.

12. The method of claim 10, wherein the evaluation further comprises decoding, by the processor, the combined machine-readable code embedded in the assessment sheet to obtain the one or more first location identifiers indicative of the correct answers of one or more questions in each of the plurality of scanned assessment sheets.

13. The method of claim 12, wherein the evaluation further comprises identifying, by the processor, one or more second location identifiers of the one or more second markings on each of the plurality of scanned assessment sheets.

14. The method of claim 13, wherein the identifying of the one or more second location identifiers comprises determining coordinates of the one or more second markings.

15. The method of claim 13, wherein the evaluation further comprises comparing, by the processor, the one or more second location identifiers with the one or more first location identifiers.

16. The method of claim 14, wherein the evaluation further comprises generating, by the processor, a result based on the comparison.

17. A system for creating a plurality of assessment sheets, the system comprising:
a memory comprising one or more program instruction modules, the one or more program instruction modules comprise:
a location identification module configured to identify one or more first location identifiers of one or more first markings in a scanned master assessment sheet, wherein the one or more first markings are indicative of correct answers of one or more questions in the scanned master assessment sheet;
a code generation module configured to generate a machine-readable code, to be embedded in a scanned pre-assessment sheet, based on the one or more first location identifiers of the one or more first markings, indicative of the correct answers, identified in the scanned master assessment sheet;
a code splitting module configured to split the machine-readable code into a plurality of portions;
an embedding module configured to embed the plurality of portions of the machine-readable code at a plurality of locations in the scanned pre-assessment sheet; and
one or more processors operable to execute the location identification module, the code generation module, the code splitting module, and the embedding module.

18. The system of claim 17, further comprising a printing module operable to print the scanned pre-assessment sheet after the embedding of the plurality of portions of the machine-readable code to obtain the plurality of assessment sheets.

19. The system of claim 17, further comprising a scanning module configured to facilitate scanning of each of the plurality of assessment sheets filled by an evaluatee, wherein each of the plurality of assessment sheets comprises one or more second markings corresponding to one or more answers provided by the evaluatee.

20. The system of claim 19, further comprising a code combining module configured to:
combine the plurality of portions of the machine-readable code embedded at the plurality of locations in each of the plurality of assessment sheets based on an authentication; and
decode the combined machine-readable code to obtain the one or more first location identifiers.

21. The system of claim 20, wherein the location identification module is further configured to identify one or more second location identifiers of the one or more second markings.

22. The system of claim 21, further comprising a result generation module configured to:
compare the one or more second location identifiers with the one or more first location identifiers; and
generate a result of an evaluation based on the comparison.

23. A computer program product for use with a computer, the computer program product comprising a non-transitory computer-readable medium storing a computer-readable program code for creating a plurality of assessment sheets, the computer-readable program code comprising:
a program instruction means for identifying one or more first location identifiers of one or more first markings in a scanned master assessment sheet, wherein the one or more first markings are indicative of correct answers of one or more questions in the scanned master assessment sheet;
a program instruction means for generating a machine-readable code, to be embedded in a scanned pre-assessment sheet, based on the one or more first location identifiers of the one or more first markings, indicative of the correct answers, identified in the scanned master assessment sheet;
a program instruction means for splitting the machine-readable code into a plurality of portions;
a program instruction means for embedding the plurality of portions of the machine-readable code at a plurality of locations in the scanned pre-assessment sheet; and
a program instruction means for printing the scanned pre-assessment sheet to create the plurality of assessment sheets.

24. A method for creating and evaluating a plurality of assessment sheets, the method comprising:
identifying, by a processor, one or more first location identifiers of one or more first markings in a scanned master assessment sheet, wherein the one or more first markings are indicative of correct answers of one or more questions in the scanned master assessment sheet;

generating, by the processor, a machine-readable code, to be embedded in a scanned pre-assessment sheet, based on the one or more first location identifiers of the one or more first markings, indicative of the correct answers of the one or more questions provided by an evaluator, identified in the scanned master assessment sheet;

splitting, by the processor, the machine-readable code into a plurality of portions;

embedding, by the processor, the plurality of portions of the machine-readable code at a plurality of locations in the scanned pre-assessment sheet;

printing the scanned pre-assessment sheet to create the plurality of assessment sheets;

combining, by the processor, the plurality of portions of the machine-readable code embedded at the plurality of locations in each of the plurality of assessment sheets based on an authentication to generate a combined machine-readable code;

decoding, by the processor, the combined machine-readable code embedded in each of the plurality of assessment sheets to obtain the one or more first location identifiers indicative of the correct answers of one or more questions in each of the plurality of assessment sheets;

identifying, by the processor, one or more second location identifiers of one or more second markings on each of the plurality of assessment sheets, wherein the one or more second markings are indicative of one or more answers provided by an evaluatee in response to one or more questions in each of the plurality of assessment sheets;

comparing, by the processor, the one or more second location identifiers with the one or more first location identifiers; and generating, by the processor, a result of evaluation based on the comparison.

25. A method for evaluating one or more assessment sheets, the method comprising:

combining, by a processor, a plurality of portions of a machine-readable code (MRC) embedded at a plurality of locations in an assessment sheet based on an authentication to generate a combined MRC, wherein the generated combined MRC, to be embedded in a scanned pre-assessment sheet, is based on one or more first location identifiers of one or more first markings, indicative of correct answers of one or more questions provided by an evaluator, identified in a scanned master assessment sheet;

decoding, by the processor, the combined MRC embedded in the assessment sheet to obtain one or more first location identifiers indicative of the correct answers of the one or more questions in the assessment sheet;

identifying, by the processor, one or more second location identifiers of one or more second markings on the assessment sheet, wherein the one or more second markings are indicative of one or more answers provided by an evaluatee in response to the one or more questions in the assessment sheet;

comparing, by the processor, the one or more second location identifiers with the one or more first location identifiers; and generating, by the processor, a result of the evaluation based on the comparison.

* * * * *